Mar. 6, 1923. 1,447,217
E. S. LINCOLN
TROLLEY BASE
Filed Apr. 5, 1922 2 sheets-sheet 1

H. J. Stromberger.

Inventor
Ellis S. Lincoln.
By
Attorney

Mar. 6, 1923.

E. S. LINCOLN 1,447,217

TROLLEY BASE.

Filed Apr. 5, 1922

Witness

Helge G. Ekedahl.

Inventor
Ellis S. Lincoln
By
Attorney

Patented Mar. 6, 1923.

1,447,217

UNITED STATES PATENT OFFICE.

ELLIS S. LINCOLN, OF MANSFIELD, OHIO, ASSIGNOR TO THE OHIO BRASS COMPANY, OF MANSFIELD, OHIO, A CORPORATION OF NEW JERSEY.

TROLLEY BASE.

Application filed April 5, 1922. Serial No. 549,805.

*To all whom it may concern:*

Be it known that I, ELLIS S. LINCOLN, a citizen of Sweden, residing at Mansfield, in the county of Richland and State of Ohio, have invented certain new and useful Improvements in Trolley Bases, of which the following is a specification.

My invention relates to trolley bases and more particularly to trolley bases as applied to trolley busses or other vehicles which operate without regard to following a path directly in line with and below the trolley wire. In other words the invention is applicable to what is now often termed trackless trolley or trolley bus operation.

In such operation there are certain conditions met with which are not found in the ordinary operation of street cars which follow a fixed path with respect to the trolley wire as determined by the track. One of the conditions is that the trolley pole and current collector used for conveying the current from the trolley wire to the car must be capable of maintaining its contact with the trolley wire regardless of the lateral distance between the trolley wire and the bus within such limits as are defined by the length of the trolley pole. Such operation may mean that the projected horizontal angle between the axis of the trolley pole and the longitudinal axis of the car may be as much as 60 degrees. In other words the trolley pole may switch to one side of the longitudinal center line of the car as much as 60 degrees and in some cases possibly more, but the greater the angle the greater will be the difficulty of maintaining the current collector in contact with the trolley wire and it is for this reason that I have devised ways and means of overcoming this difficulty which are automatic in their operation and extremely simple, and which I have more clearly set forth and disclosed hereinafter.

When a moving vehicle to which the trolley pole and current collector are attached is moving below and directly in line with the trolley wire there is no normally acting force tending to disengage the current collector from the trolley wire of sufficient magnitude to be taken into account. Practically the only force of any magnitude is that of the upward pressure of the current collector against the under side of the trolley wire which is counteracted by an equal downward force from the trolley wire and as long as the trolley bus is operating as just described, this force is not one likely to cause the collector to leave the trolley wire. When, however, the trolley bus is operated to one side of the trolley wire and the pole is forming an angle with both the trolley bus and the wire, there is a force tending to cause the current collector to leave the wire acting in a rearward direction due to the friction between the wheel and the wire. There is also a force in the same direction due to the wind pressure against the forward face of the trolley pole which depends upon the relative speed of the car with regard to the wind and the exposed area of the trolley pole and current collector. There is also, due to variations in the speed of the car, a force necessary to overcome the momentum in the pole. All of these forces and possibly others are acting in the same direction and are, therefore, accumulative and are very difficult to calculate, but nevertheless it is well known and can plainly be seen that such forces exist. It will also be seen that these forces are greater with the greater angle formed between the trolley pole and the car in a horizontal direction and, therefore, any means which tends to counteract these forces should be of such a character as to automatically increase as the angle between the trolley pole and car increases. With my invention counteracting forces are created which automatically increase as the angle between the car and the pole increases.

The means I employ in creating a counteracting force consists of gravity acting upon the trolley pole and also the spring tension tending to maintain the current collector in contact with the trolley wire. All of these elements are present in any of the ordinary types of trolley bases, poles and collectors at the present time, and to make use of these elements I find that it is only necessary to incline the axis of the base at the vehicle roof and about which axis the base rotates in a forward direction or the upper end of the axis is inclined in the direction in which the vehicle moves. By inclining the axis of the base from a perpendicular which is the ordinary practice so that the upper end of the axis is inclined in the direction in which the vehicle moves, I am able to create two forces acting in the same direction and are therefore accumulative, and which forces increase as the horizontal angle between the vehicle and the trolley pole increases. In fact the forces created by inclining the axis of the base just described are zero when the trolley pole is trailing behind the vehicle and in line with the axis of the movement of the car, but they are a maximum when the pole is thrown around at right angles to the directions in which the vehicle is moving.

It is possible for me to use many of the type of trolley bases, poles and current collectors employing a spring for urging the trolley pole to rise by merely inclining the axis of the base about which it rotates as described above. It will be seen from this statement, more fully disclosed later, that this is a very simple means of accomplishing the results secured.

Therefore, my invention resides in the novel relation of the trolley base with respect to the vehicle to which it is secured.

In the drawings accompanying the specification:—

Figure 1:
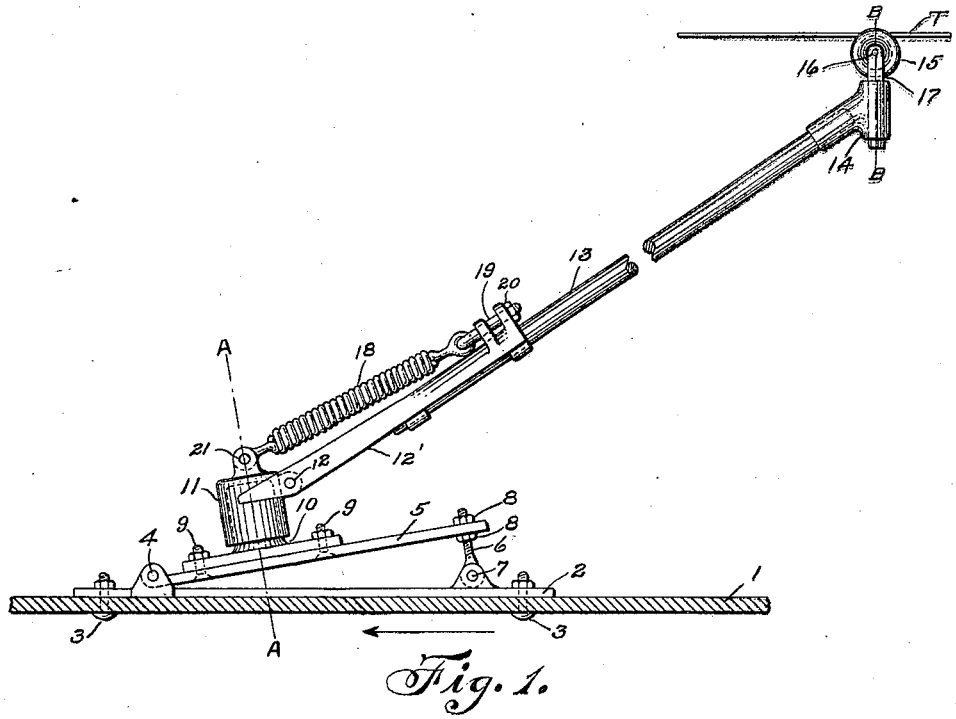
Fig. 1 is a side view of a trolley base in combination with a vehicle having the axis of the trolley base inclined as described above.
Figure 3:
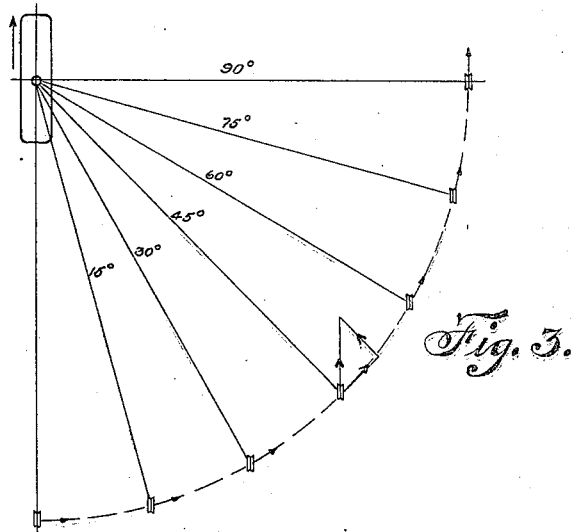
Fig. 3 is a diagrammatic view representing a base secured to a vehicle and the pole assuming various angles with the longitudinal center line of the vehicle from zero to 90 degrees.
Figure 5:
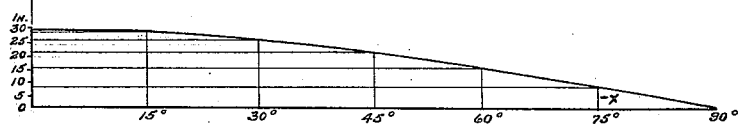
Fig. 5 is a developed view of the path which the current collector tends to take relative to the trolley wire.

If when the trolley pole coincides with the 90 degree line in Fig. 3 and the current collector is at the height of the trolley wire and the pole is then fixed with relation to its base so that it cannot swing upwardly, and if the pole and base are then rotated about the axis shown in Fig. 1 until the pole coincides with the zero position in Fig. 3, the current collector will have described a path with respect to the trolley or the horizontal as shown by the curve in Fig. 5. In other words if the base and pole arranged as just described the current collector starts at the same height as the trolley wire on the 90 degree line when it has rotated around to the zero line the current collector will be the height above the trolley wire indicated by Fig. 5. Before going into further details in regard to the forces I will describe a preferred form of construction to bring about the results I secure.

In Fig. 1 is shown a trolley base mounted upon a vehicle 1 which is arranged to move in the direction indicated by the arrow. The trolley base mounted thereon comprises a sub-base 2 secured to the vehicle by means of the bolts or other fastening 3. Pivotally secured to the sub-base 2 by the hinge pin 4 is a platform 5. The platform 5 may be raised or lowered at one end about the hinge 4 by means of the threaded member 6 pivotally secured to the sub-base 2 by means of the hinge 7. The platform 5 is held at any height by means of the threaded nuts 8—8 mounted on the threaded stud 6.

Secured to the platform 5 by means of the bolts 9 is the trolley base proper which is provided with a pedestal 10 and a turret 11 mounted thereon to rotate about the axis A—A of the pedestal. Pivotally secured to the turret 11 by means of the hinge 12 is a trolley arm 12′ to which is secured a trolley pole 13. To the outer end of the trolley pole is secured a trolley collector 14 provided with a trolley wheel 15 adapted to engage the trolley wire T and to rotate about a horizontal pin 16 and mounted on a member 17 adapted to rotate about its vertical axis B—B. It will be obvious that the rotation of the trolley wheel about the vertical axis B—B is important in order that the wheel may aline with the trolley wire regardless of the movement of the vehicle to one side or the other of the center line of the trolley wire.

To the trolley arm 12 is secured a spring 18 by means of the threaded bolt 19 and nut 20. The opposite end of the spring is secured to the turret through the medium of the end 21. The tension of the spring 18 may be adjusted by the nut 20 and the spring is constantly urging the upward movement of the trolley pole.

With the construction just described it will be evident that it will be possible to vary the inclination of the axis A—A which will permit the force, which I will call the gravity force, tending to rotate the pole and base about its inclined axis, due to gravity, to be varied and the means for varying the tension on the spring 18 permits the pressure of the current collector against the trolley wire T to be varied and which effects the magnitude of the other counteracting force to be later described, and which I call the spring force.

Figure 2:
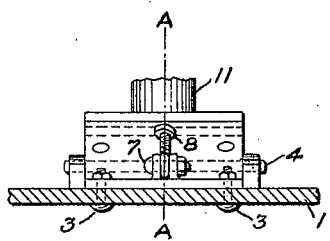
Fig. 2 is an end view of the lower portion of the base shown in Fig. 1 which further shows the means whereby the inclination of the axis of the base may be varied.

It will also be evident to most anyone that the inclination of the axis A—A can be brought about in any instance where a trolley base is mounted upon a vehicle with its axis perpendicular by merely raising the trailing end of the base and securing it in a raised position as by a shim. I do not, however, know of any such construction having been used and the same would be within the scope of my invention as the same forces would be produced in the same way as by the means shown in Figs. 1 and 2 and just described. The arrangement which I show, however, has the advantage that the angle of inclination of the axis A—A can be very readily altered to change the forces.

In the operation of my device it will be readily understood that as long as the axis of the pole is in line with the longitudinal axis of the car and as indicated by the zero line in Fig. 3 that gravity is acting on the pole directly downward and that the pole will remain stationary, but if the axis of the pole is moved so as to correspond with the 15 degree line in Fig. 3 that the gravity acting upon the pole has no counteracting force of equal magnitude and that the pole will tend, through the force of gravity acting upon it, to move further to the right and so on until it has moved through 180 degrees when it will again be in equilibrium. Assuming the weight of the pole upon which the force of gravity acts as 20 pounds and assuming the angle which the inclined axis A—A makes with the vertical as 10 degrees then the gravity force, as I have termed it, acting upon the trolley pole to move it about the axis of the base will vary in accordance with the curve in Fig. 4 marked gravity force. It will be seen that this force is zero when the axis of the pole is in a trailing position and that it becomes a maximum when the pole is at 90 degrees to the longitudinal axis of the vehicle as shown by the curve assuming a horizontal position at this point.

It will be evident that if the axis A—A is exactly perpendicular that there will be no tendency for the pole to move about its axis, therefore, by inclining the axis I have been able to create a force due to gravity acting upon the trolley pole tending to move the pole about its axis in the direction in which the vehicle is moving. The spring force which I have mentioned is created through the tendency of the pole to rise above the trolley wire as it moves from a 90 degree position in Fig. 3 around to the zero position, and in view of the fact also that this tendency to rise is against the tension of the spring 18. The result is that of moving a weight the equivalent of the spring tension through a certain height as indicated by the curve in Fig. 5 for any angular position of the pole relative to the vehicle.

The curve as shown in Fig. 5 as already stated is the developed path which the current collector tends to take in starting from the 90 degree point and moving around to the zero point and this path is relative to the trolley wire which is assumed to be horizontal, therefore, if we assume that the spring tension is 30 pounds, in moving from the 90 degree to the 75 degree point in Fig. 3, the current collector would normally rise the distance indicated as $x$ (Fig. 5), but as the trolley wheel is pressing against the under surface of the trolley wire, it cannot rise and, therefore, the trolley pole and arm must move downwardly about the pivotal point 12 and relative to the axis A—A and the amount of such movement at any point as formed by the angle which the pole makes with the vehicle is as indicated by the curve shown in Fig. 5. The lowering of the trolley pole relative to the trolley base or its axis A—A at any point is the equivalent of moving a weight of 30 pounds through a vertical distance indicated by the curve 5 and along an inclined plane whose incline corresponds with that of the curve. Such force when plotted for the various points between zero and 90 degrees as shown in Fig. 3 will result in the curve shown in Fig. 4 marked tension spring force.

Figure 4:
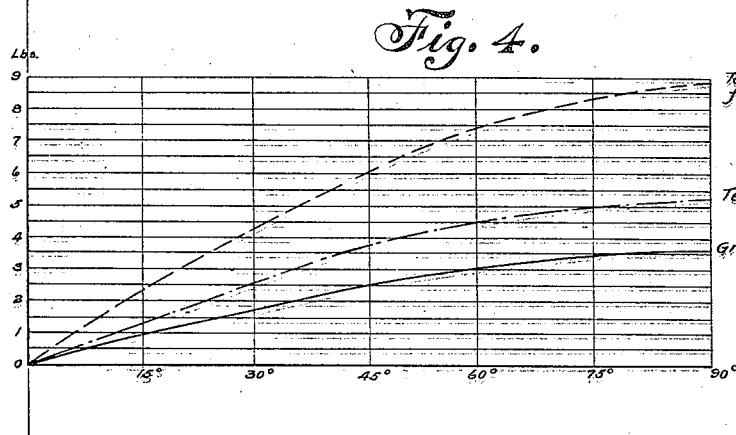
Fig. 4 shows the plotting of the counter balancing forces already described which are the result of my invention or discovery.

The summation of the gravity force and spring tension force is shown by the curve so marked in Fig. 4, and it will be seen that the summation of these curves is a maximum when the trolley pole assumes a line corresponding with that of 90 degrees in Fig. 3. This summation force acts at right angles to the trolley pole and in the direction indicated by the arrow on Fig. 3. This force at any point has a component force acting in a forward direction which is counter to the various forces mentioned earlier in this specification, and which tend to throw the current collector from the conductor. This component force along the direction of the moving vehicle may be arrived at from resolving the summation force into its component element as indicated by the triangle of forces in Fig. 3.

It will be quite obvious that I have discovered that by inclining the axis of the trolley base forwardly with respect to the direction of the moving vehicle as previously described, that I am able to create two forces acting in the same direction at right angles to the direction of the pole at any of its angular positions relative to the car and that such forces have a component acting in the direction in which the vehicle is moving; it will also be obvious that these forces, which I have termed gravity force and tension spring force, may be each varied, namely, the gravity and spring force by altering the inclination of the axis of the base and the tension spring force by altering the tension of the spring 18.

Having set forth and described my discovery and the means for putting the same into practical operation and use, I claim:

1. The combination with a vehicle of a trolley base provided with a pedestal having the upper end of its axis inclined forward (in the direction the vehicle moves) and in line with the longitudinal axis of the vehicle, means to vary the inclination of the axis, a turret mounted on the pedestal and rotatable thereon about the inclined axis, a pole pivotally mounted on the turret to swing in a substantially vertical plane, a current collector pivotally mounted on the pole to swivel about a substantially vertical axis and to engage a conductor, a spring to urge the pole to rise and means to vary the tension of the spring.

2. The combination with a vehicle of a trolley base provided with a pedestal having the upper end of its axis inclined forward, a turret mounted on the pedestal and rotatable thereon about the inclined axis, a pole pivotally mounted on the turret to swing in a substantially vertical plane, a current collector mounted on the pole to engage a conductor, a spring to urge the pole to rise and means to vary the tension of the spring.

3. The combination with a vehicle of a trolley base provided with a pedestal having the upper end of the axis inclined forward, means to vary the inclination of the axis, a turret mounted on the pedestal and rotatable thereon about the axis, a pole pivotally mounted on the turret to swing in a substantially vertical plane, a current collector mounted on the pole to engage a conductor and a spring to urge the pole to rise.

4. The combination with a vehicle of a trolley base provided with a pedestal having the upper end of its axis inclined forward, a turret mounted on the pedestal and rotatable thereon about the inclined axis, a pole pivotally mounted on the turret to swing in a substantially vertical plane, a current collector mounted on the pole and means urging the pole to move about the pivotal point.

5. The combination with a vehicle of a trolley base provided with a pedestal having the upper end of its axis inclined in a forward direction, a turret mounted on the pedestal and rotatable thereon about the inclined axis, a pole mounted on the turret and a current collector mounted on the pole to engage a conductor.

6. The combination with a vehicle of a trolley base provided with a pedestal having the upper end of its axis inclined forward, means to vary the inclination of the axis, a turret mounted on the pedestal and rotatable thereon about the inclined axis, a pole mounted on the turret and a current collector mounted on the pole to engage a conductor.

7. The combination with a vehicle of a trolley base mounted thereon comprising a current collector to engage a conductor, a member to which the collector is secured, means to which the member is pivotally attached for movement in a substantially vertical plane; said means being mounted for rotation about an axis having its upper end enclined in a forward direction relative to the vehicle roof.

8. The combination with a vehicle of a current collector to engage a conductor, supporting means to which the collector is mounted and means for securing the collector and its supporting means to the vehicle whereby the collector and its supporting means will rotate about an axis having its upper end inclined in a forward direction relative to the direction of travel of the vehicle.

9. The combination with a vehicle of a trolley base secured thereto and rotatable about an axis having its upper end inclined in the direction of travel of the vehicle.

10. The combination with a vehicle of a current collector and its supporting means, and means for mounting the supporting means on a vehicle to permit the pole to rotate about an axis parallel to a vertical longitudinal plane and having its uper end inclined in the direction of travel of the vehicle.

11. The combination with a vehicle of a current collector and its supporting means, means for mounting the supporting means on a vehicle to permit the pole to rotate about an axis parallel to a vertical longitudinal plane and having its upper end inclined in the direction of travel of the vehicle and means to vary the forward inclination of the axis.

12. The combination with a vehicle of a current collector, a support for the collector arranged to swing laterally about an axis from a trailing position to a leading position with respect to the direction of travel of the vehicle, means operating automatically to move the support and collector from a trailing to a leading position and means for varying at will the degree of said moving means.

13. The combination with a vehicle of a current collector, and a support for the collector adapted to swing laterally from a longitudinal axis of the vehicle and means tending to move the support and collector about an axis in a lateral direction and in the direction of motion of the vehicle.

14. The combination with a vehicle of a current collector and a support for the collector adapted to swing laterally about an axis and means whereby gravity acting on the support and collector will swing the support and collector about the axis in the lateral direction and in the direction of travel of the vehicle.

15. The combination with a vehicle of a trolley base provided with a pole and a current collector thereon to engage a conductor, the pole arranged to rotate about an inclined axis, the inclination of the axis being so arranged that the force of gravity acting upon the moving parts will cause the pole and collector to rotate about the axis and in the direction of travel of the vehicle.

16. The combination with a vehicle of a combined current collector and trolley base having its axis of rotation so arranged that the center of gravity of the parts is constantly changed as the parts rotate about the axis and operating to move the collector about the axis of rotation from a trailing position to a leading position with respect to the direction of travel of the vehicle.

17. The combination with a vehicle of a current collector to engage a conductor, a supporting arm to which the collector is attached, means for securing the arm to the vehicle, means to permit the arm to swing about an axis in a vertical plane, means to move the arm and collector upward about the axis of the pole, means to permit the arm to swing in a lateral direction about an inclined axis the inclination so arranged as to cause the arm and collector to be depressed relative to the inclined axis when the arm is moved from a position at right angles to a longitudinal axis of the vehicle to a position coinciding with a longitudinal axis of the vehicle.

18. In combination with a vehicle a trolley base provided with a current collector and arm to support same, means for securing the arm to the vehicle to permit the arm to move in a vertical plane and swing laterally relative to the vehicle about an axis, means urging the arm to move upward, the axis so arranged as to create two forces tending to swing the arm and conductor about the axis and in the direction of normal motion of the vehicle one force acting when the vehicle is moving or stationary and the other force acting to resist the arm swinging from a position to one side of the vehicle to a position in line with the vehicle.

19. The combination with a vehicle of a current collector, a support for the collector, means for securing the support to the vehicle such that the support will rotate laterally to the vehicle about an inclined axis having its upper end inclined in the direction in which the vehicle moves.

20. The combination with a vehicle of a rotatable trolley base, arm and current collector and means for inclining the axis of rotation with the upper end of the axis inclined in the direction in which the vehicle travels.

21. The combination with a vehicle of a rotatable trolley base, arm and current collector, and means for creating a force tending to rotate the parts about its axis in the direction in which the vehicle moves, the said force increasing as the arm moves from a trailing position in line with the direction of travel to a point where the arm is at right angles to the direction of travel of the vehicle.

22. The combination with a vehicle of a current collector, a support for the collector arranged to swing laterally about an axis from a trailing position to a leading position with respect to the direction of travel of the vehicle, means operating automatically to move the support and collector from a trailing to a leading position.

23. The combination with a vehicle of a trolley base secured thereto and rotatable by the force of gravity about an axis having its upper end inclined in the direction of travel of the vehicle.

24. The combination with a vehicle and a current collecting device of interposed mechanism operated by a shifting of the center of gravity tending to move the collector from a longitudinal trailing position to a longitudinal leading position with respect to the direction of travel of the vehicle.

In testimony whereof I affix my signature.

ELLIS S. LINCOLN.